(12) United States Patent
Shigematsu et al.

(10) Patent No.: US 8,432,470 B2
(45) Date of Patent: Apr. 30, 2013

(54) DATA CONVERSION/OUTPUT APPARATUS FOR DIGITALIZING SENSOR DATA AND OUTPUTTING THROUGH A SENSOR ARRAY

(75) Inventors: Satoshi Shigematsu, Kanagawa (JP); Hiroki Morimura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 44 days.

(21) Appl. No.: 13/032,508

(22) Filed: Feb. 22, 2011

(65) Prior Publication Data

US 2011/0141081 A1     Jun. 16, 2011

Related U.S. Application Data

(62) Division of application No. 12/629,840, filed on Dec. 2, 2009, now Pat. No. 7,911,520, which is a division of application No. 11/740,761, filed on Apr. 26, 2007, now abandoned, which is a division of application No. 10/059,488, filed on Jan. 28, 2002, now abandoned.

(30) Foreign Application Priority Data

Jan. 30, 2001    (JP) ................................ 2001-020993

(51) Int. Cl.
*H04N 3/14* (2006.01)
*H04N 5/335* (2011.01)

(52) U.S. Cl.
USPC .......................................... 348/300; 348/302

(58) Field of Classification Search .................. 348/300, 348/302, 304, 312
See application file for complete search history.

(56) References Cited

U.S. PATENT DOCUMENTS

| 5,565,915 | A | 10/1996 | Kindo et al. |
| 5,872,596 | A | 2/1999 | Yanai et al. |
| 6,330,030 | B1 | 12/2001 | O'Connor |
| 6,587,145 | B1 | 7/2003 | Hou |

FOREIGN PATENT DOCUMENTS

| EP | 0 675 345 | 10/1995 |
| EP | 0954167 | 11/1999 |
| JP | 02067880 A | 3/1990 |
| JP | 6-3193 | 1/1994 |
| JP | 09270961 A | 10/1997 |
| WO | WO 97/34374 | 9/1997 |
| WO | WO 00/38409 | 6/2000 |

OTHER PUBLICATIONS

"Tokkyo Parusu Kairo Jiten", published on May 1980.
D. Renshaw et al., "ASIC Vision", Digest of IEEE Custom Integrated Circuits Conference, 1990.

(Continued)

*Primary Examiner* — Kelly L Jerabek
(74) *Attorney, Agent, or Firm* — Blakely, Sokoloff, Taylor & Zafman (57) ABSTRACT

A data conversion/output device includes a number of sensors, voltage-time conversion circuits that are arranged adjacent to respective sensors and change output levels upon the lapse of times corresponding to output voltage values from the sensors after a conversion operation start point in order to convert for voltage outputs of the sensors into times. The device also includes sensed data generation circuits outputting, as digital data, lapse times until the output levels of the voltage-time conversion circuits change after a conversion start point. The sensed data generation circuits include a counter for counting a clock signal. An operation start of the voltage-time conversion circuits and a start of count operation of the counter are staggered.

10 Claims, 12 Drawing Sheets

OTHER PUBLICATIONS

A. Simoni et al., "A Digital Camera for Machine Vision", Conference on Industrial Electronics, Control and Instrumentation, 1994.

"A Digital Camera for Machine Vision", Simoni, A; Gottardi, M; Sartori, A; Zorat, A; Industrial Electronics, Control and Instrumentation, 1994, IECON 1994, 20th International Conference on—vol. 2, Sep. 5-9, 1994 pp. 879-883 vol. 2.

FIG.12 PRIOR ART ically as to the present invention.

DATA CONVERSION/OUTPUT APPARATUS FOR DIGITALIZING SENSOR DATA AND OUTPUTTING THROUGH A SENSOR ARRAY

CROSS-REFERENCE TO RELATED APPLICATION

The present patent application is a Divisional application claiming the benefit of application Ser. No. 12/629,840 filed Dec. 2, 2009, now U.S. Pat. No. 7,911,520 which is a divisional application of application Ser. No. 11/740,761, filed Apr. 26, 2007, now abandoned which is a divisional application of non-provisional U.S. patent application Ser. No. 10/059,488, filed Jan. 28, 2002, now abandoned.

BACKGROUND OF THE INVENTION

1. Field

The present invention relates to a data conversion/output apparatus and, more particularly, to a data conversion/output apparatus for converting data sensed by each sensor into a digital value and outputting the digital value in a sensor array constituted by laying out a plurality of sensors for detecting light or a capacitance.

2. Description of the Related Art

Figure 10:
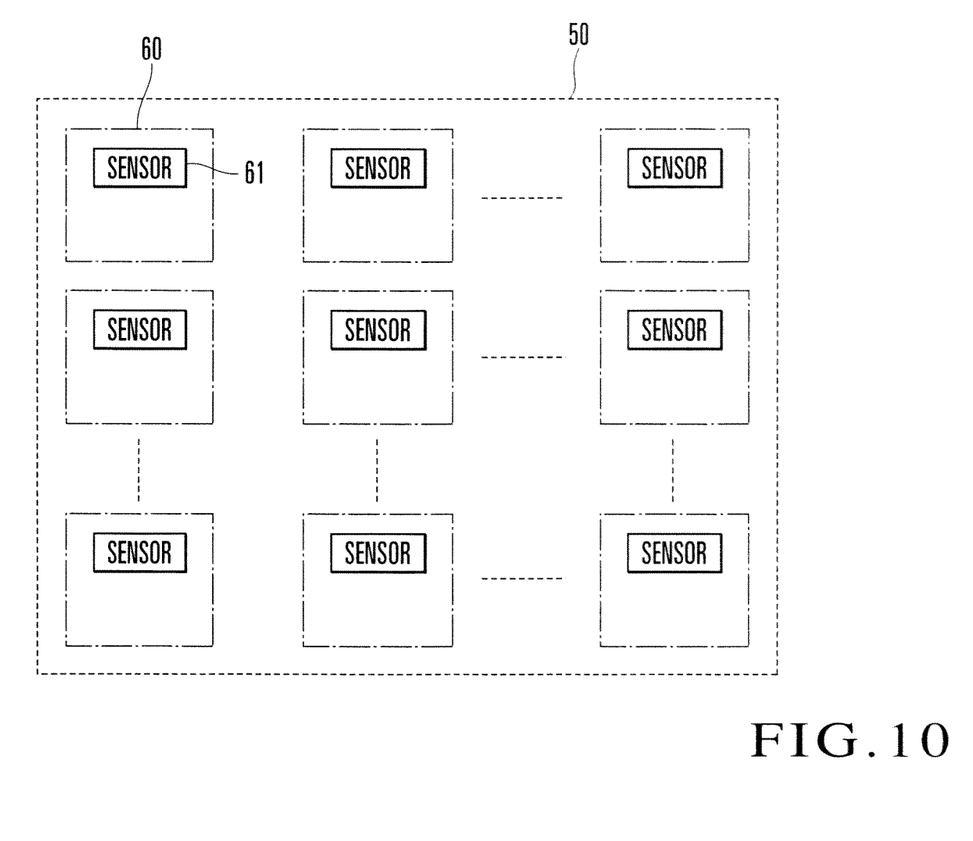
FIG. 10 is a block diagram showing a sensor array.

As a sensor array constituted by laying out a plurality of sensors for detecting light or a capacitance, many sensor arrays have recently been developed for a photosensor or fingerprint sensor which has a matrix of a plurality of pixels 60 each bearing a sensor 61 for detecting light or a fingerprint shape and reads an image or fingerprint, as shown in FIG. 10. In these sensor arrays, analog data detected by a sensor in each pixel must be converted into digital data and output outside a pixel array 50. Various data conversion/output apparatuses for converting data sensed by each sensor into a digital value and outputting it have been proposed.

Figure 11:
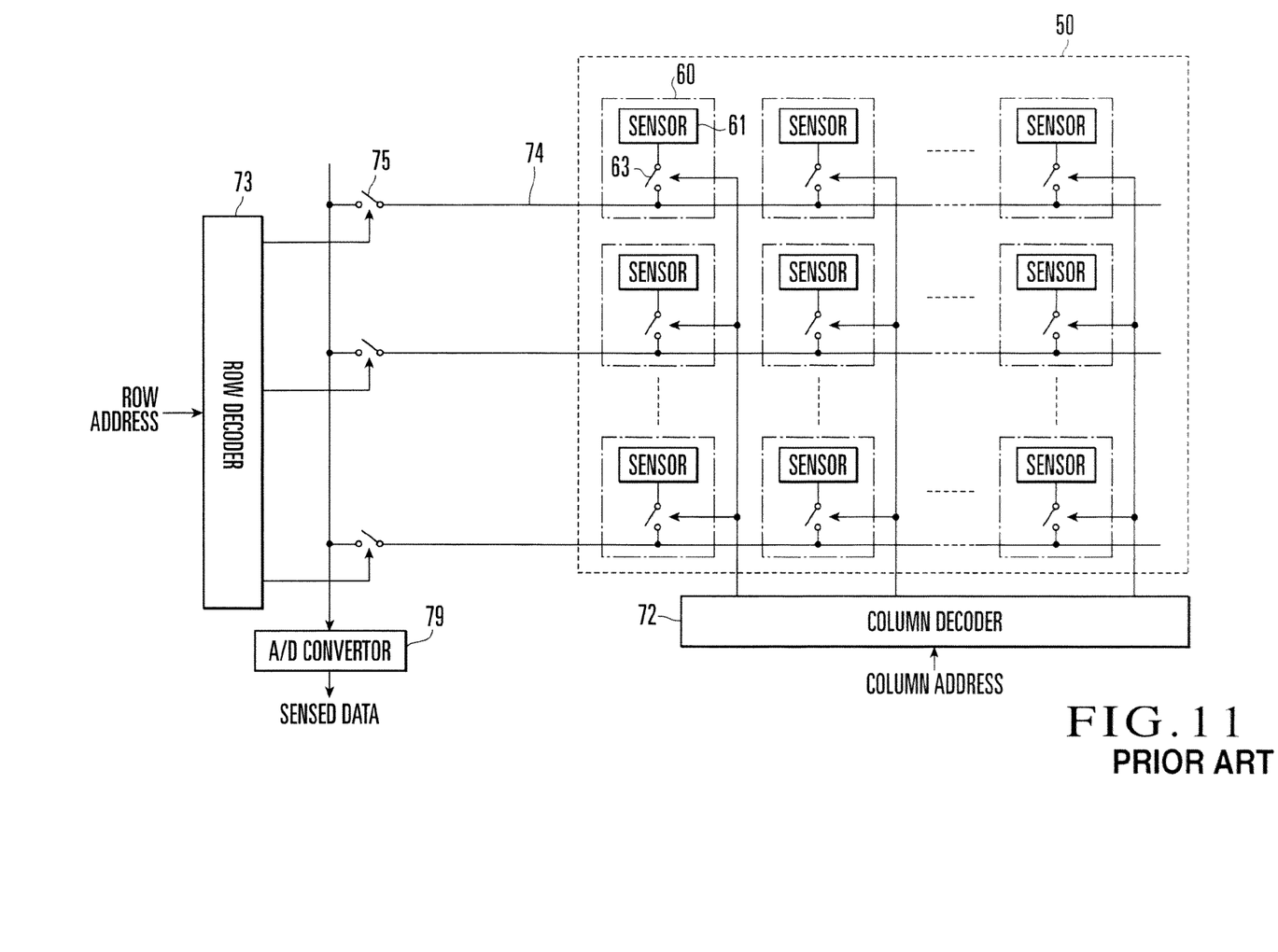
FIG. 11 is a block diagram showing a conventional data conversion/output apparatus (first prior art)

FIG. 11 shows the first prior art of a conventional data conversion/output apparatus (see, e.g., D. Renshow et al., "ASIC VISION", Digest of IEEE Custom Integrated Circuits Conference, 1990). In the prior art of FIG. 11, sensors 61 and switches 63 are integrated in respective pixels 60, and these pixels 60 are arrayed in a matrix. The switch 63 in each pixel 60 is controlled by a signal from a column decoder 72, and connected to a data bus 74 shared by the pixels 60 on each row.

The data bus 74 is connected to a corresponding switch 75, and to an A/D converter 79 via the switch 75. The switch 75 is controlled by a signal from a row decoder 73.

In this data conversion/output apparatus, light or the like is detected by the sensors 61. The address of a column to be read is input to the column decoder 72, and the column decoder 72 sends a signal for closing the switches 63 of pixels 60 on the column whose address has been input. The sensors 61 on the selected column output detected analog data to the data bus 74 shared by each row. Then, the address of a row to be read is input to the row decoder 73, and the row decoder 73 sends a signal for closing the switches 75 connected to the data bus 74.

The selected data bus 74 is connected to the A/D converter 79, and the analog data output to the data bus 74 is input to the A/D converter 79. The A/D converter 79 converts the input analog data into digital data and outputs it outside as sensed data. By performing this operation for all the columns and rows, all read data can be converted into digital data and output outside.

Figure 12:
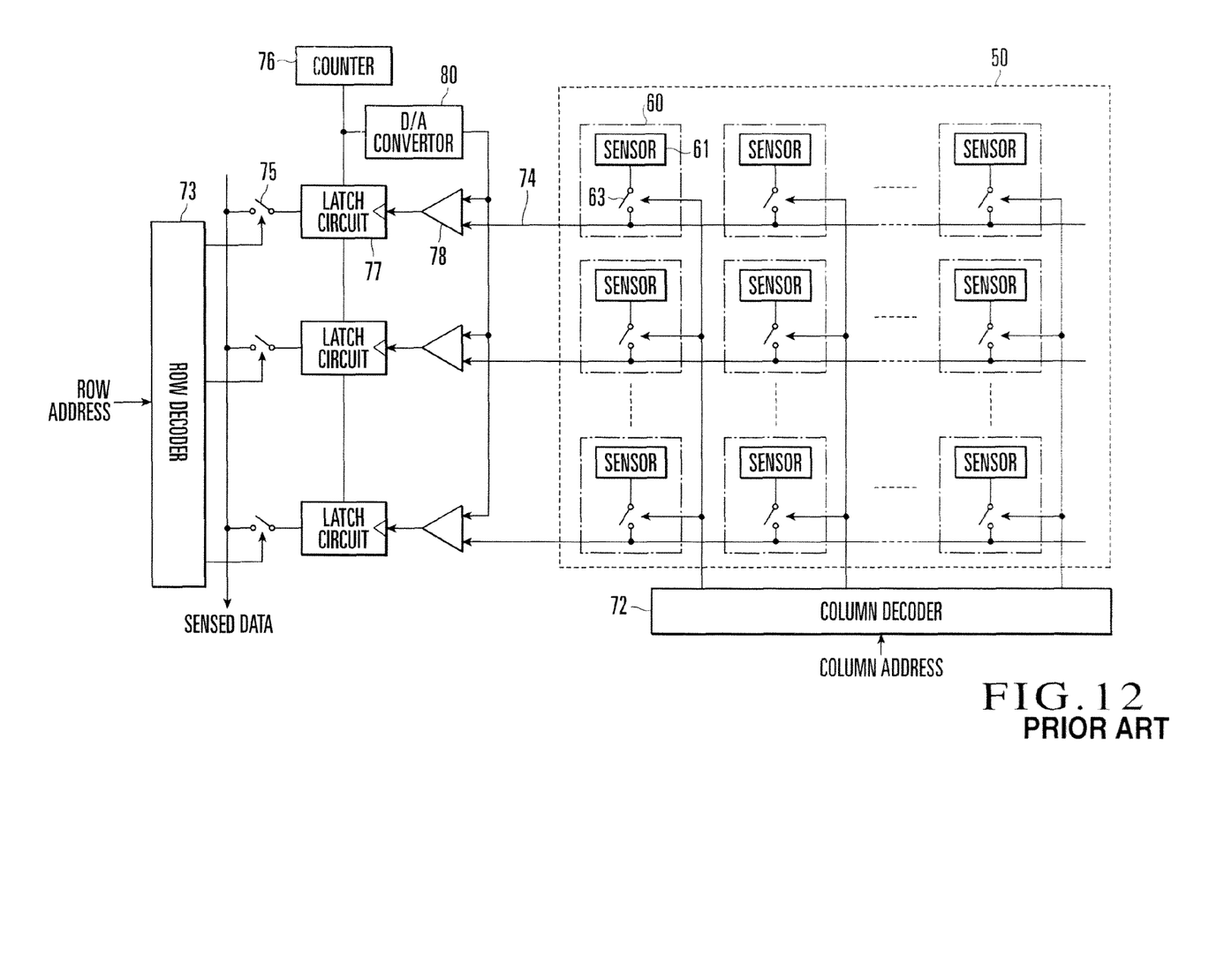
FIG. 12 is a block diagram showing another conventional data conversion/output apparatus (second prior art).

FIG. 12 shows the second prior art (see, e.g., A. Simoni et al., "A Digital Camera for Machine Vision", Conference on Industrial Electronics, Control and Instrumentation, 1994). In the prior art of FIG. 12, the data bus 74 shared by pixels 60 on each row as the first prior art is connected to a corresponding comparison circuit 78, and the other input of the comparison circuit 78 is connected to the output of a D/A converter 80. The input of the D/A converter 80 is connected to the output of a counter 76, and the output of the counter 76 is connected to each latch circuit 77. As a read signal to the latch circuit 77, an output from the comparison circuit 78 is input. An output from the latch circuit 77 is output outside via a corresponding switch 75, and the switch 75 is controlled by a signal from a row decoder 73.

In the data conversion/output apparatus, light or the like is detected by the sensors 61. The address of a column to be read is input to the column decoder 72, and the column decoder 72 sends a signal for closing the switches of pixels on the column whose address has been input. The sensors 61 on the selected column output detected analog data to the comparison circuit 78 via the data bus 74 shared by each row. The counter 76 increments data from a minimum value to a maximum value, and outputs the data. The output from the counter is input to the D/A converter 80, and the D/A converter 80 outputs analog data which increases stepwise in correspondence with the count value.

The comparison circuit 78 compares the analog data output from the D/A converter 80 with the analog data output from the sensors, and only when the data coincide with each other in magnitude, sends a read signal to the latch circuit 77. The latch circuit 77 receives an output from the counter 76, and when the read signal is sent from the comparison circuit 78, latches a count value at that time. Then, the address of a row to be read is input to the row decoder 73, and the row decoder 73 sends a signal for closing the switches 75 connected to the data bus 74. An output from the latch circuit 77 on the selected row is output outside as sensed data via the switch 75. By performing this operation for all the columns and rows, all read data can be converted into digital data and output outside.

These conventional data conversion/output apparatuses suffer the following problems. The first prior art requires a long time in order to convert and output data of all the pixels because data detected by pixels are converted by the A/D converter one by one. Analog data is transmitted via a long path and many elements, so detected data may be easily degraded by noise or the like.

In the second prior art, the dynamic range, resolution, and precision of data to be output are limited by the precision of the D/A converter because reference analog data to be compared with analog data detected by the sensor is generated by the D/A converter. Output data may also be degraded by the precision of the comparison circuit for comparing analog data or variations between comparison circuits.

SUMMARY OF THE INVENTION

The present invention has been made to overcome the conventional drawbacks, and has as its object to provide a data conversion/output apparatus capable of preventing degradation in the precision of a sensor output due to noise or variations between elements, and obtaining a wide-dynamic-range output whose resolution or precision is not limited.

To achieve the above object, according to the present invention, there is provided a data conversion/output apparatus comprising a large number of sensors, voltage-time conversion circuits which are arranged adjacent to the respective sensors and change output levels upon the lapse of times corresponding to output voltage values from the sensors after a conversion operation start point in order to convert voltage outputs of the sensors into times, and sensed data generation circuits for outputting, as digital data, lapse times until the output levels of the voltage-time conversion circuits change after a substantial conversion start point.

DESCRIPTION OF THE PREFERRED EMBODIMENTS

Preferred embodiments of the present invention will be described below with reference to the accompanying drawings.

First Embodiment

Figure 1:
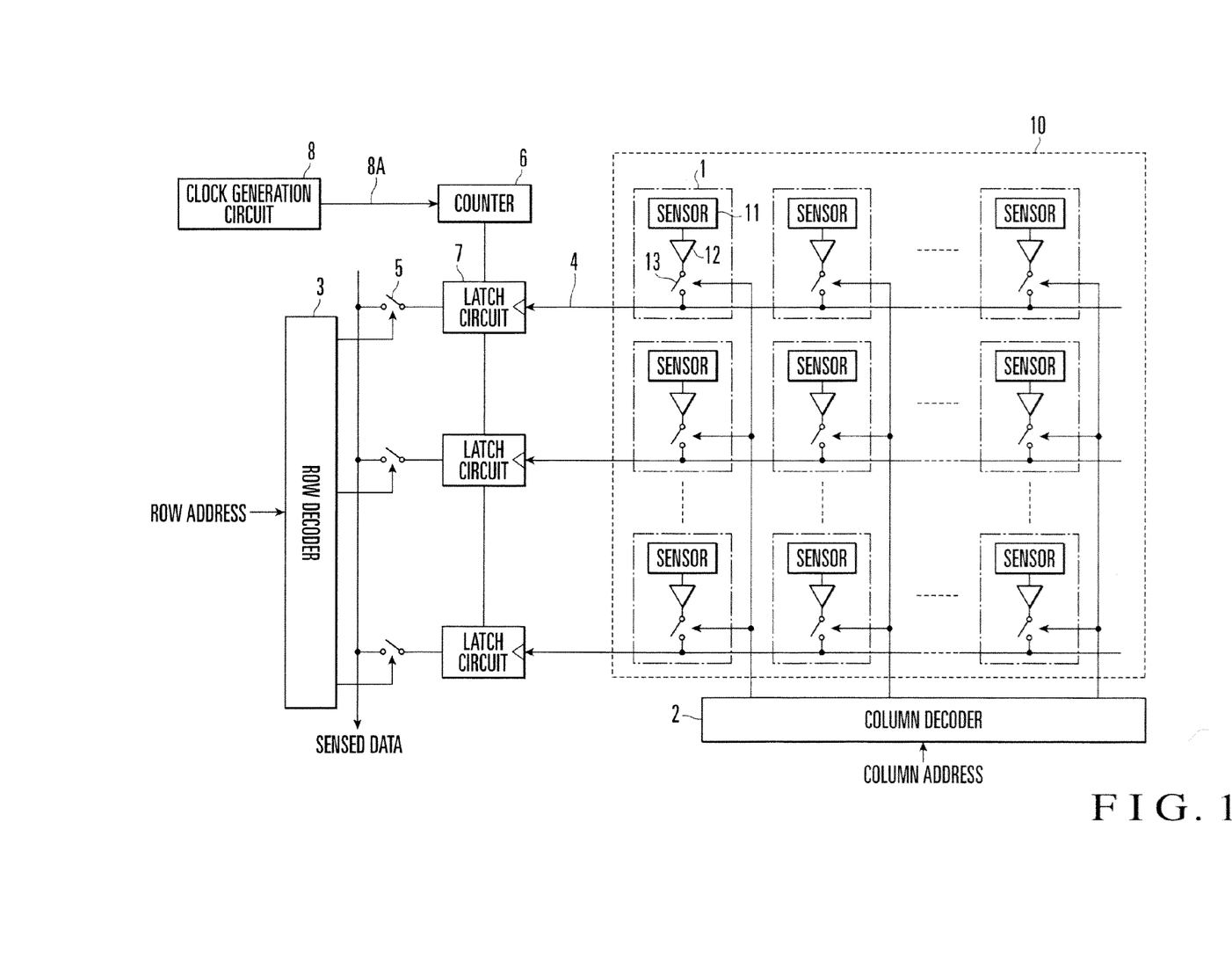
FIG. 1 is a block diagram showing a data conversion/output apparatus according to the first and other embodiments (including the seventh embodiment) of the present invention.

FIG. 1 shows a data conversion/output apparatus according to the first embodiment of the present invention. This data conversion/output apparatus comprises a plurality of pixels 1 arranged in a matrix within a pixel array 10, a column decoder (control means/group selection means) 2, a row decoder 3, data buses 4, switches (row switches) 5, a counter 6, latch circuits (sensed data generation circuits) 7, and a clock generation circuit 8.

Each pixel 1 includes a sensor 11, voltage-time conversion circuit 12, and switch (column switch) 13. The switch 13 is controlled for each column by a signal from the column decoder 2. The voltage-time conversion circuit 12 converts analog data output from the sensor 11 into 1-bit digital data by a delay time. As an example of the digital data, an output from the voltage-time conversion circuit 12 changes from L level to H level within a relatively short time after the start of conversion for a high input voltage, and from L level to H level within a relatively long time after the start of conversion for a low input voltage.

An output from the voltage-time conversion circuit 12 is output to the data bus 4 via the switch 13. Pixels 1 on the same row are connected to the same data bus 4, and the data bus 4 is shared by each row. An output from the data bus 4 of each row is input as a read signal to the latch circuit 7 disposed for each row. The latch circuit 7 is connected to the output of the counter 6, and a count value output from the counter 6 is held by the read signal of the latch circuit 7. An output from the latch circuit 7 is output outside as sensed data via a corresponding switch 5. The switch 5 is controlled by a signal from the row decoder 3.

In this arrangement, analog data representing the detection results of the respective pixels 1 are output for each column. Light or a capacitance is detected by the sensors 11 in all or some of the pixels 1, and detected analog data are output from the sensors 11. The address of the column of pixels 1 to be read is input to the column decoder 2. A signal to the switches 13 in the pixels 1 on the corresponding column becomes active, and the switches 13 in the pixels 1 on the selected column are turned on. Count operation of the counter 6 starts in response to a predetermined external signal or a signal from the column decoder 2 to the switches 13. At the same time, the operation of the voltage-time conversion circuits 12 in the pixels 1 on the selected column starts. Upon the lapse of a delay time corresponding to voltages output from the sensors 11, outputs from the voltage-time conversion circuits 12 change from L level to H level.

The outputs from the voltage-time conversion circuits 12 are input as a read signal from the switches 13 to a corresponding latch circuit 7 via the data bus 4. The latch circuit 7 latches a count value output from the counter 6 when the read signal changes to H level. After all the latch circuits 7 read count values, a row address to be input to the row decoder 3 is sequentially changed from 1. Then, the switch 5 of each selected row is turned on to output outside the count value latched by the latch circuit 7 on the row as sensed data obtained by converting analog data from the sensors 11 into digital data. This output operation is executed for all the rows and columns, which realizes conversion and external output of digital data of data detected by the sensors 11 of all the pixels 1.

Figure 2A:
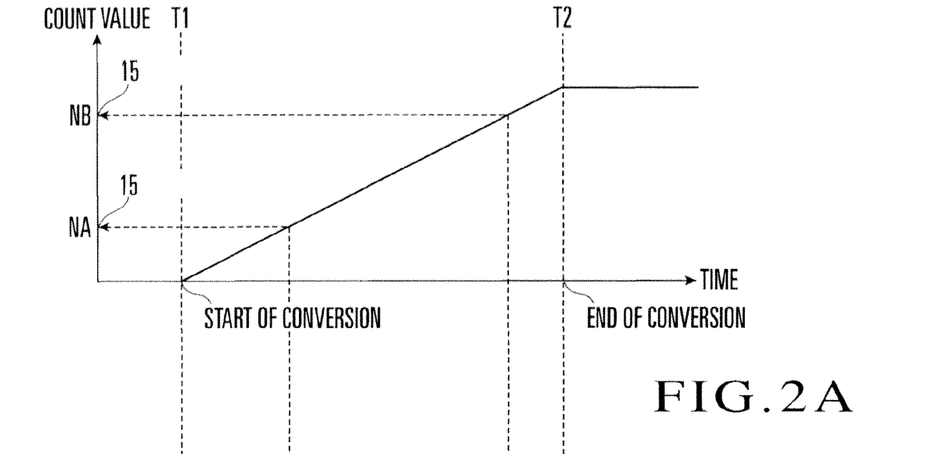
FIGS. 2A to 2C are graphs showing the operation of the first embodiment.
Figure 2B:
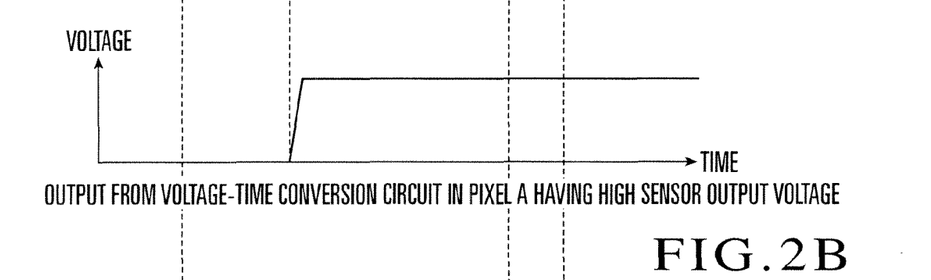
Figure 2C:
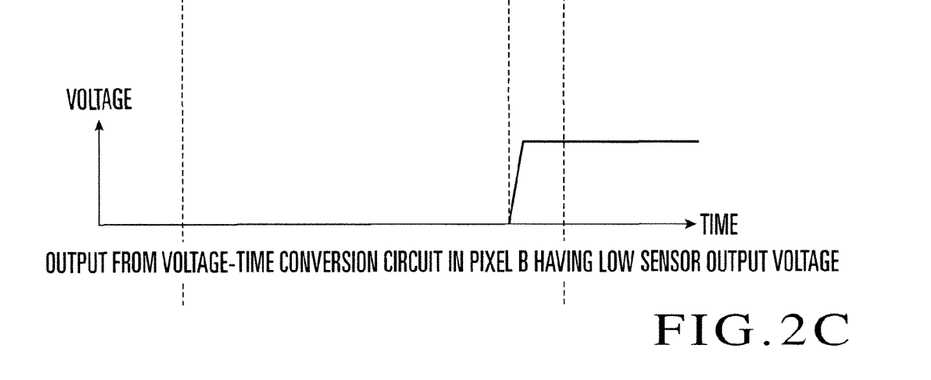

FIGS. 2A, 2B, and 2C show the detailed operation of the first embodiment. FIG. 2A shows a count value output from the counter 6 to the lapse of time. FIGS. 2B and 2C respectively show outputs from the voltage-time conversion circuits 12 in a pixel with a high output voltage of the sensor 11 and a pixel with a low output voltage of the sensor 11. At time T1, the operation of the counter 6 starts to increment a count value prepared by counting clock signals 8A from the clock generation circuit 8. At the same time, the operation of each voltage-time conversion circuit 12 starts. In the following embodiments, the clock signal 8A is generated using the clock generation circuit 8. Alternatively, the clock generation circuit 8 may be arranged in the counter 6 to generate the clock signal 8A.

In pixel A where the output voltage of the sensor 11 is high, an output from the voltage-time conversion circuit 12 changes from L level to H level upon the lapse of a relatively short time after the start of conversion, as shown in FIG. 2B. When an output from the pixel A changes to H level, the latch circuit 7 corresponding to pixel A reads and latches a count value NA output from the counter 6.

In pixel B where the output voltage of the sensor 11 is low, an output from the latch circuit changes from L level to H level upon the lapse of a relatively long time after the start of conversion, as shown in FIG. 2C. When an output from the pixel B changes to H level, the latch circuit 7 corresponding to pixel B latches a count value NB output from the counter 6. The count values NA and NB latched by the latch circuits 7 serve as digital data with respect to analog data from the sensors 11, and are output outside.

A combination of the voltage-time conversion circuit 12 and the latch circuit 7 for latching a count value enables converting a signal propagating through a long distance via the data bus 4 into a 1-bit digital signal of H or L level. Degradation in precision by noise or the like can be prevented. The first embodiment does not require any reference signal for a comparison circuit, unlike the prior art, and the counter can operate independently of the pixel array 10. The maximum value or the count value increment slope can be arbitrarily adjusted, and data can be converted with high resolution and a wide dynamic range.

Second Embodiment

Figure 3:
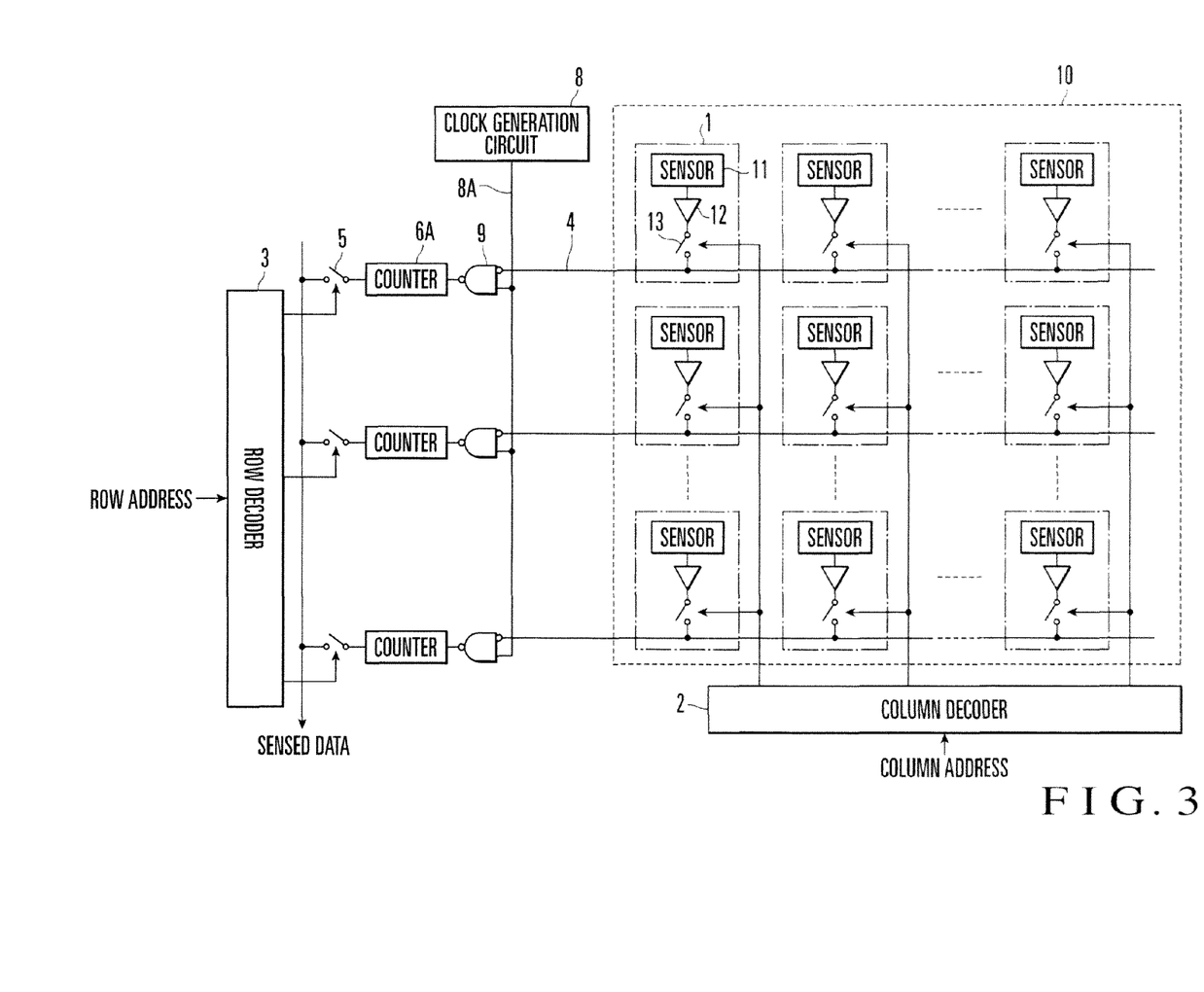
FIG. 3 is a block diagram showing a data conversion/output apparatus according to the second embodiment of the present invention.

The second embodiment according to the present will be described with reference to FIG. 3. FIG. 3 shows a data conversion/output apparatus according to the second embodiment. In the second embodiment, the counter 6 shared by all the pixels 1 is set as a new counter (row counter/sensed data generation means) 6A on each row, instead of the latch circuit 7 set on each row in the first embodiment. A clock signal 8A generated by a clock generation circuit 8 is distributed to respective rows. The clock signal 8A and a data bus 4 are connected to an AND circuit (gate circuit) 9 disposed on each row. An output from the AND circuit 9 is input as the clock of the counter 6A on each row.

The AND circuit 9 directly outputs the input clock signal 8A when a signal on the data bus 4 is at L level, and outputs an L-level signal when the signal on the data bus 4 is at H level. In the second embodiment, similar to the first embodiment, data is output for each column. Light or a capacitance is detected by sensors 11 in all or some of pixels 1, and detected analog data are output from the sensors 11. The address of the column of pixels 1 to be read is input to a column decoder 2, and a signal to switches 13 in the pixels 1 on the corresponding column becomes active. The switches 13 in the pixels 1 on the selected column are turned on to connect the outputs of voltage-time conversion circuits 12 in the pixels to the data bus 4.

Before conversion, the values of all the counters 6 are cleared. Conversion operation of the voltage-time conversion circuits 12 in the pixels 1 on the selected column starts simultaneously when generation of the clock signal 8A starts. At time corresponding to the voltage output from the sensor 11, a signal on the data bus 4 changes from L level to H level. While an output from the voltage-time conversion circuit 12 in the pixel 1 is at level, the clock signal 8A is input to the counter 6A on the row of the pixel 1 via the AND circuit 9, and count operation continues. When the output from the voltage-time conversion circuit 12 changes to H level, the AND circuit 9 changes the clock signal 8A to the counter 6A on this row to L level, and count operation stops. After the operations of the counters 6A on all the rows stop, sensing to the column ends.

After that, the row address input to a row decoder 3 is sequentially changed from 1 to turn on a switch 5 on the selected row. The count value held by the counter 6A is output outside as sensed data obtained by converting detected data into digital data. This output operation is executed for all the rows and columns, which enables conversion and external output of digital data of data detected by the sensors 11 of all the pixels.

The second embodiment distributes not the count value but only the clock signal 8A to respective columns, and can reduce power necessary for distribution, compared to distribution of a multi-bit count value. Since the latch circuit operates by the counter 6A, any extra latch circuit can be eliminated to downsize the circuit.

Third Embodiment

Figure 4:
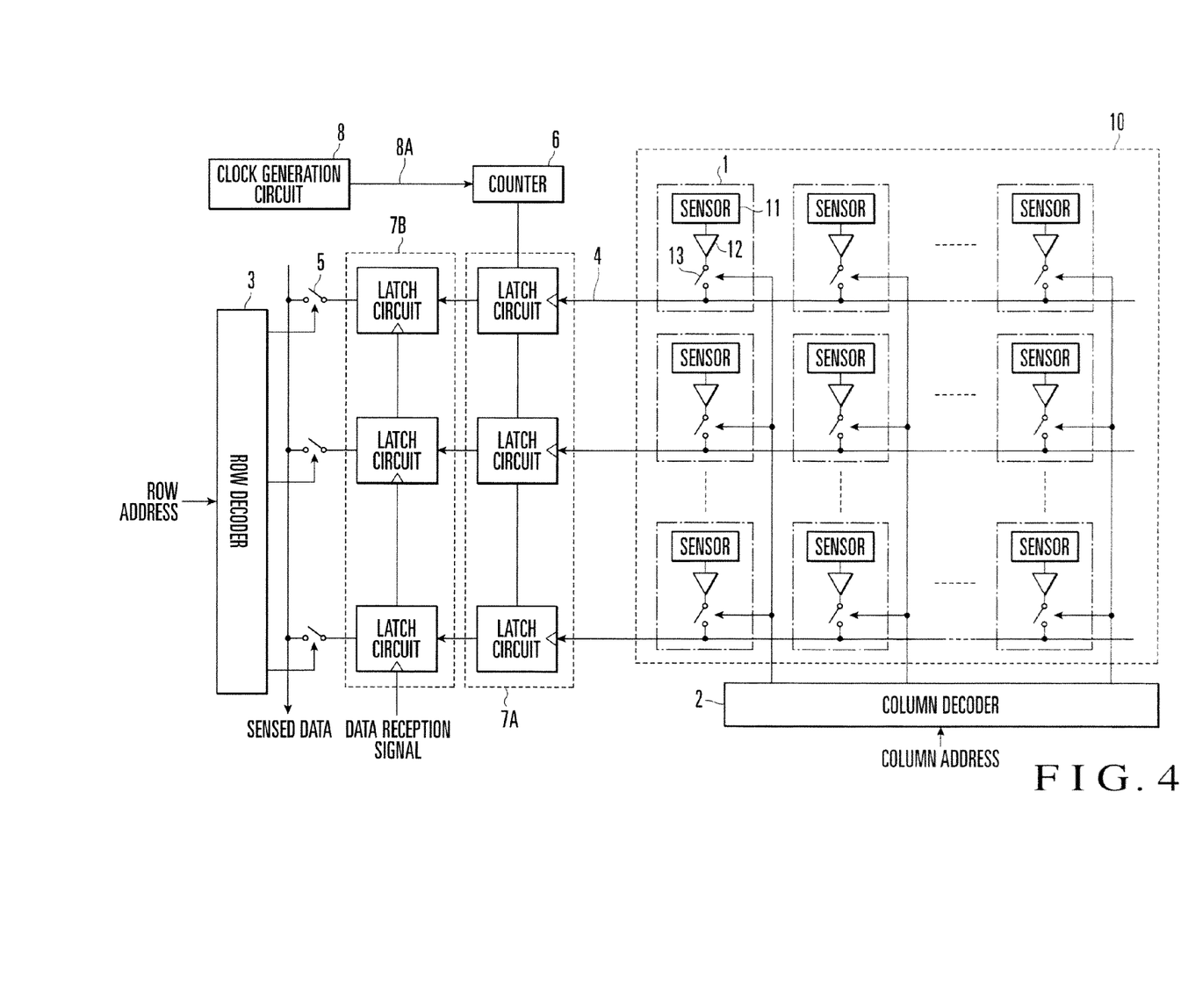
FIG. 4 is a block diagram showing the operation of the third embodiment of the present invention.

The third embodiment according to the present invention will be described with reference to FIG. 4. FIG. 4 shows a data conversion/output apparatus according to the third embodiment. In the third embodiment, an output-side latch circuit 7B formed from latch circuits set on respective rows is interposed in the arrangement of the first embodiment between an input-side latch circuit (sensed data generation means) 7A formed from latch circuits set on respective rows, and switches 5 for selecting an output from the input-side latch circuit 7A. The output-side latch circuit 7B latches an output from the input-side latch circuit 7A in response to an externally supplied data reception signal. The operation from the operation of a sensor 11 up to count value reception operation of the input-side latch circuit 7A is the same as that in the first embodiment.

After all the latch circuits in the input-side latch circuit 7A read count values, a data reception signal is supplied to the output-side latch circuit 7B. The output-side latch circuit 7B reads and latches the count value (result of converting analog data into digital data) latched by the input-side latch circuit 7A. A row address is supplied to a row decoder 3 to sequentially turn on the switches 5. As a result, the converted data can be output outside. Since the converted data is latched by the output-side latch circuit 7B, the input-side latch circuit 7A is released from data latch operation and can perform conversion operation for the next operation.

This method allows parallel-executing conversion of data and external output of converted data, like pipeline operation. When detected data on many columns are to be converted/output, the operation time can be greatly reduced to realize high-speed sensing operation. Note that the third embodiment can also be applied to the second embodiment. At this time, the output-side latch circuit 7B is interposed between the counters 6A and the switches 5.

Fourth Embodiment

Figure 5:
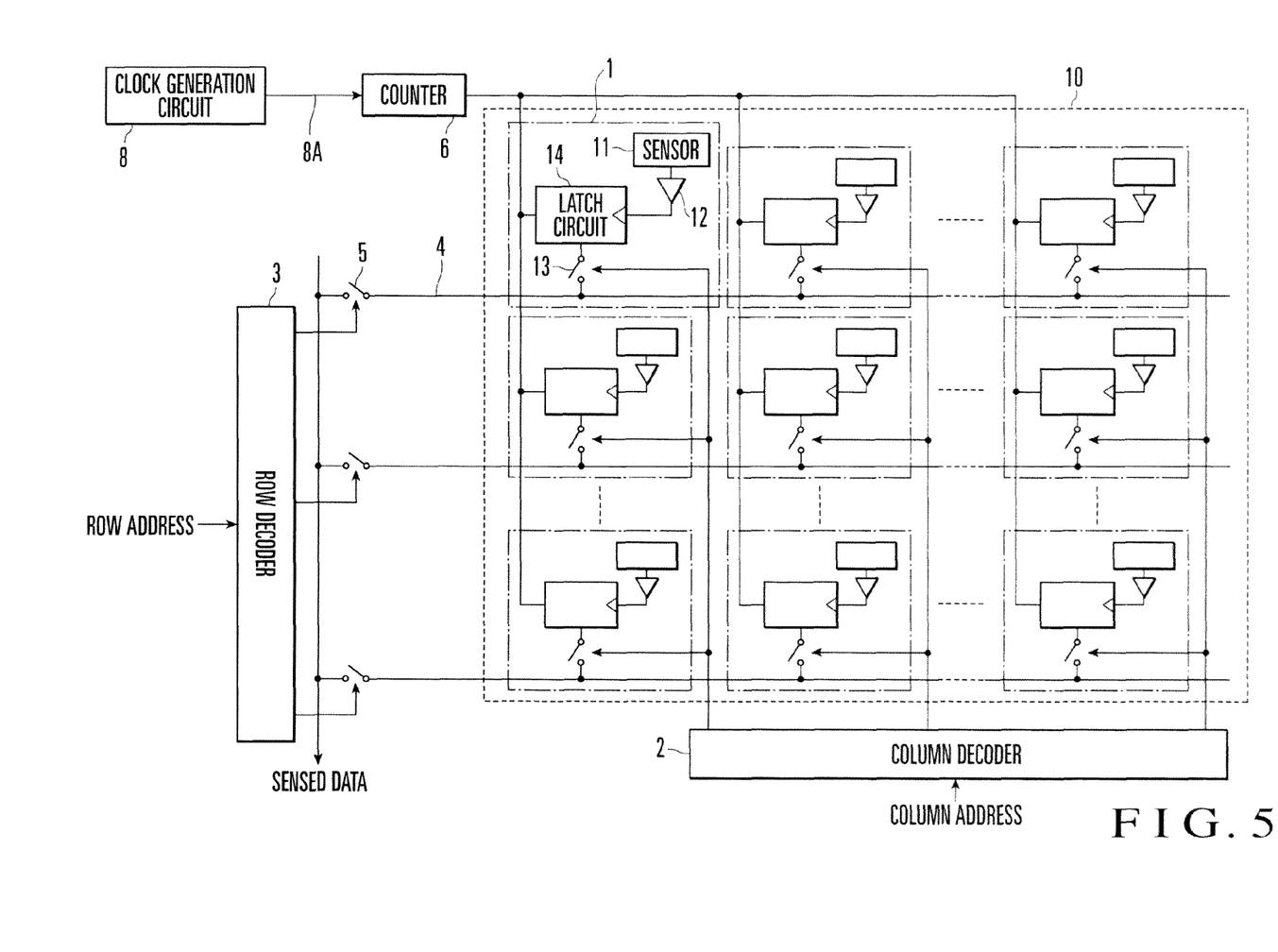
FIG. 5 is a block diagram showing a data conversion/output apparatus according to the fourth embodiment of the present invention.

The fourth embodiment according to the present invention will be described with reference to FIG. 5. FIG. 5 shows a data conversion/output apparatus according to the fourth embodiment. In the fourth embodiment, the latch circuit 7 set on each row in the first embodiment is incorporated as a new latch circuit 14 (sensed data generation means) in each pixel 1. An output from a voltage-time conversion circuit 12 in the pixel 1 is directly input as the read signal of the latch circuit 14, and a count signal generated by a counter 6 is distributed to the latch circuits 14 of all the pixels.

In this case, light or the like is detected by the sensor 11 in each pixel 1, and analog data as a detected output is input to the voltage-time conversion circuit 12. Conversion operation of the voltage-time conversion circuit 12 starts, and count operation of the counter 6 also starts. When the voltage-time conversion circuit 12 of each pixel 1 outputs an H-level signal in accordance with conversion operation, the latch circuit 14 latches a count value distributed from the counter 6 at that time. After the latch circuits 14 in all the pixels 1 latch count values, sensing ends. The column and row addresses of a pixel which is to output data are designated in the above-described manner, thereby outputting the result which is detected by the sensor and converted into digital data.

The fourth embodiment simultaneously executes the operation from detection to digital data conversion in all the pixels, and realizes higher-speed operation in comparison with conversion column by column. In outputting data, data of an arbitrary pixel can also be output instead of the row unit. The use of analog data can be restricted within the pixel, and all data transmitted outside the pixel are digital data. Thus, degradation in detection precision by noise or the like can be easily prevented.

In the fourth embodiment, the count value must be distributed to an entire pixel array 10, and a count value at given time may change between pixels owing to a count value distribution skew. However, a distribution delay by the skew can be canceled by distributing a conversion start signal to the voltage-time conversion circuit 12 through the same path as the count value distribution path because distribution of the conversion start signal also delays by the same time in a pixel where distribution of the count value delays.

Fifth Embodiment

Figure 6:
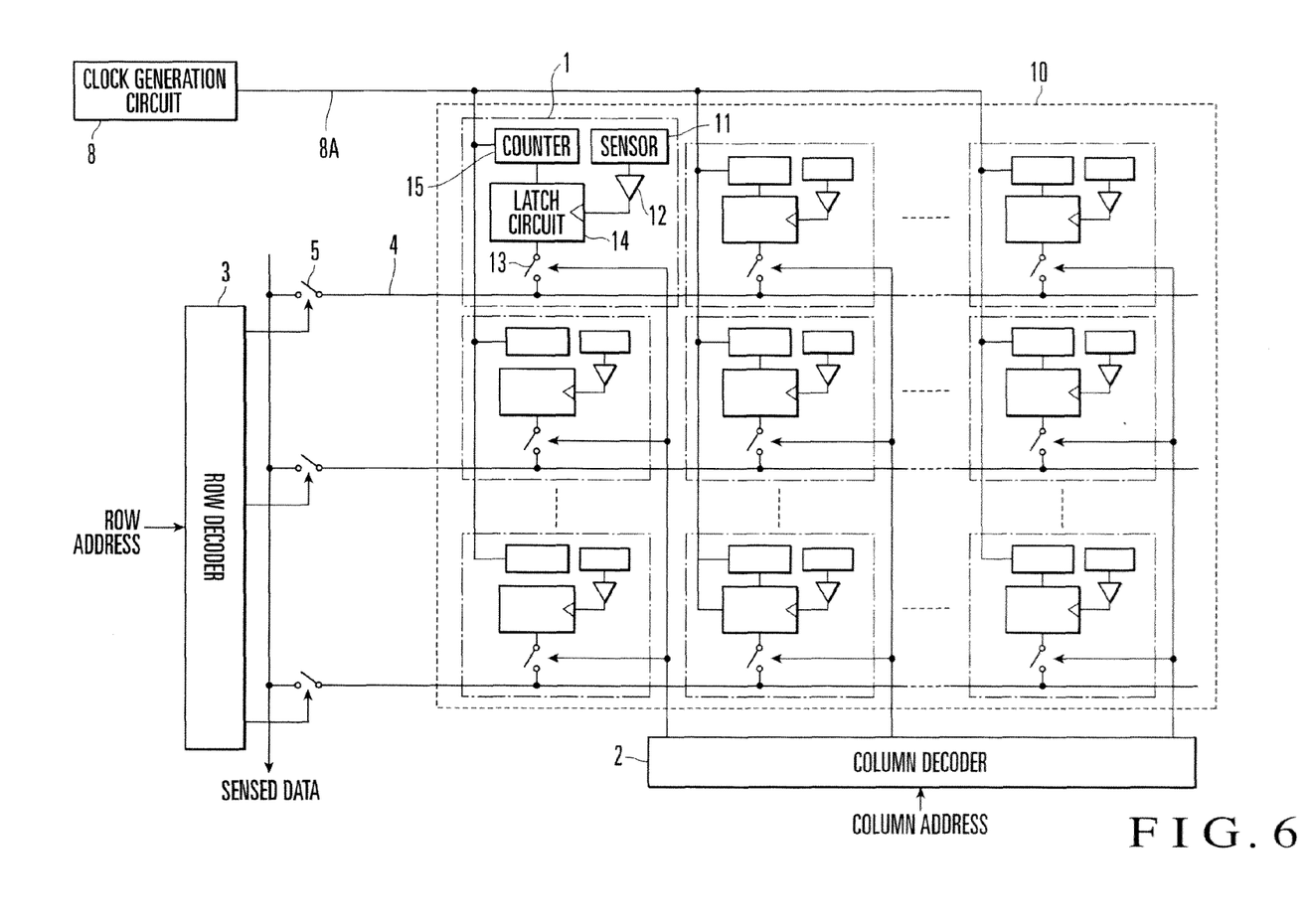
FIG. 6 is a block diagram showing a data conversion/output apparatus according to the fifth embodiment of the present invention.

The fifth embodiment according to the present invention will be described with reference to FIG. 6. FIG. 6 shows a data conversion/output apparatus according to the fifth embodiment.

In the fifth embodiment, the latch circuit 7 set on each row and the counter 6 shared by all the pixels 1 in the first embodiment are respectively set as a new latch circuit (sensed data generation means) 14 and a counter (pixel counter/sensed data generation means) 15 in each pixel 1, an output from a voltage-time conversion circuit 12 in the pixel 1 is directly input as the read signal of the latch circuit 14, and a clock signal 8A generated by a clock generation circuit 8 is distributed to the counters 15 of respective pixels.

In this case, light or the like is detected by a sensor 11 in each pixel 1, and analog data as a detected output is input to the voltage-time conversion circuit 12. Conversion operation of the voltage-time conversion circuit 12 starts, the clock generation circuit 8 distributes the clock signal 8A to the respective pixels 1, and count operation of the counter 15 in each pixel 1 starts. When the voltage-time conversion circuit 12 of each pixel 1 outputs an H-level signal, the latch circuit 14 latches a count value at that time. After the latch circuits 14 in all the pixels 1 latch count values, sensing ends. The column and row addresses of a pixel 1 which is to output data are designated, thereby outputting the detection result which is detected by the sensor 11 and converted into digital data.

The fifth embodiment simultaneously performs the operation from detection to digital data conversion in all the pixels, and realizes higher-speed operation in comparison with conversion column by column. In outputting data, data of an arbitrary pixel 1 can also be output instead of the row unit. The use of analog data can be restricted within the pixel 1, and all data transmitted outside the pixel 1 are digital data. Thus, degradation in detection precision by noise or the like can be easily prevented. Compared to the fourth embodiment, data distributed to all the pixels 1 is not the count value but the clock signal 8A, so that power necessary for distribution can be reduced.

In the fifth embodiment, similar to the fourth embodiment, a delay by a skew can be canceled by distributing a conversion start signal to the voltage-time conversion circuit 12 through the same path as the distribution path of the clock signal 8A because distribution of the conversion start signal also delays by the same time in a pixel 1 where the count delays due to the skew of the clock signal 8A.

Sixth Embodiment

Figure 7:
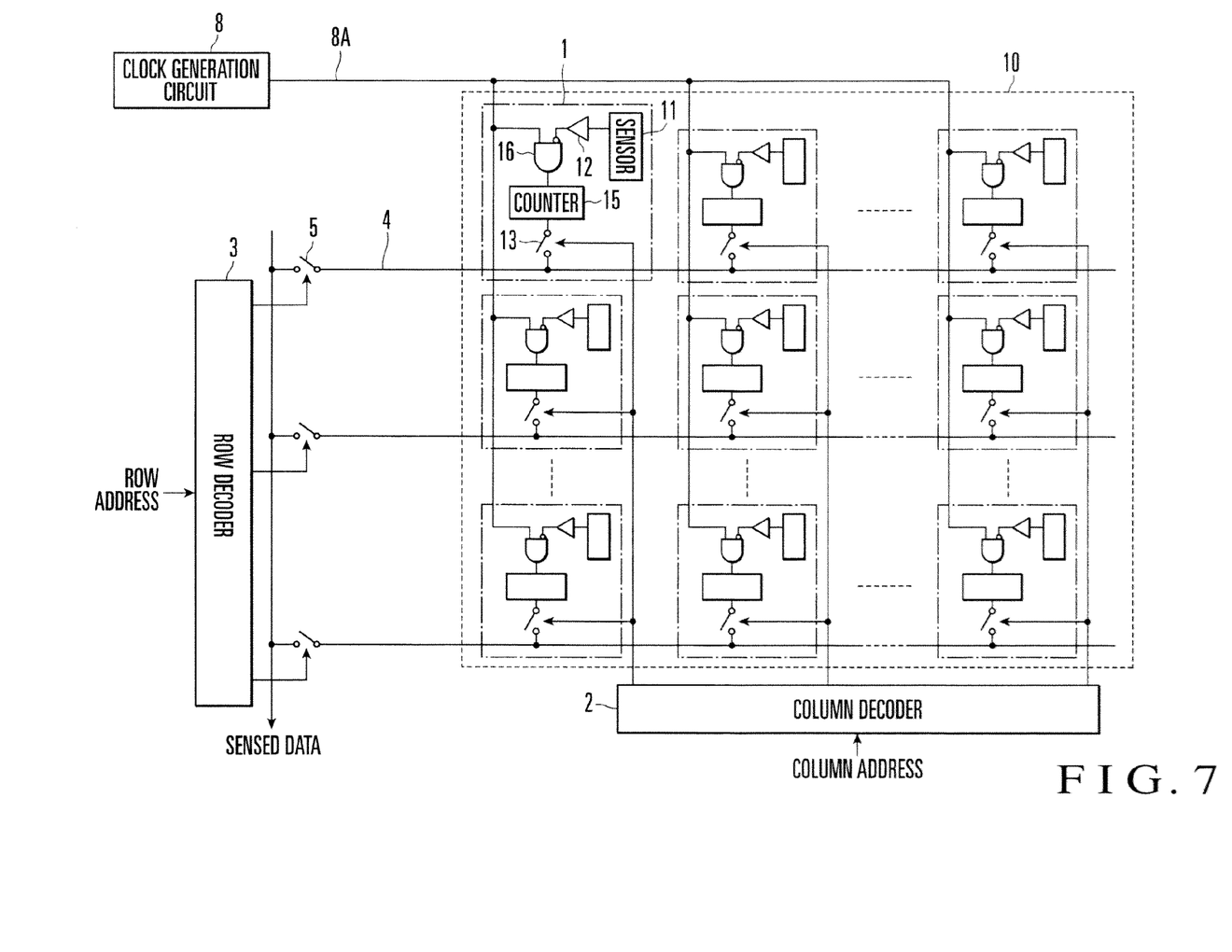
FIG. 7 is a block diagram showing a data conversion/output apparatus according to the sixth embodiment of the present invention.

The sixth embodiment according to the present invention will be described with reference to FIG. 7. FIG. 7 shows a data conversion/output apparatus according to the sixth embodiment. In the sixth embodiment, the latch circuit 7 set on each row in the first embodiment is eliminated, the counter 6 shared by all the pixels 1 is set as a new counter 15 (sensed data generation means) in each pixel 1. A clock signal 8A generated by a clock generation circuit 8 is distributed to respective pixels. An output from a voltage-time conversion circuit 12 in each pixel 1 and the distributed clock signal 8A are input to an AND circuit 16, and an output from the AND circuit 16 is input as the clock signal to the counter 15 within the pixel 1.

The AND circuit 16 directly outputs the input clock signal 8A when a signal from the voltage-time conversion circuit 12 is an L-level signal, and outputs an L-level signal when the signal from the voltage-time conversion circuit 12 is an H-level signal. In this case, light or the like is detected by a sensor in each pixel 1, and the resultant analog data is input to the voltage-time conversion circuit 12. Conversion operation of the voltage-time conversion circuit 12 starts. The clock generation circuit 8 generates the clock signal 8A and distributes it to the respective pixels 1.

While an output from the voltage-time conversion circuit 12 in each pixel 1 is an L-level signal, the distributed clock signal 8A is directly input to the counter 15, and the counter 15 continues count operation. When the voltage-time conversion circuit 12 of each pixel 1 outputs H-level signal, the counter 15 receives an L-level signal and stops count operation. If count operation stops in the counters 15 of all the pixels 1, sensing ends. The column and row addresses of a pixel which is to output data are designated, thereby outputting a count value output from the counter in the pixel as detected digital data.

The sixth embodiment simultaneously performs the operation from detection to digital data conversion in all the pixels 1, and realizes higher-speed operation in comparison with conversion column by column. In outputting data, data of an arbitrary pixel 1 can also be output instead of the row unit. The use of analog data can be restricted within the pixel 1, and all data transmitted outside the pixel 1 are digital data. Thus, degradation in detection precision by noise or the like can be easily prevented. Compared to the fourth embodiment, data distributed to all the pixels is not the count value but the clock signal 8A, so that power necessary for distribution can be reduced. Compared to the fifth embodiment, the number of elements in the pixel 1 can be reduced to implement a smaller pixel 1.

In the sixth embodiment, similar to the fourth embodiment, a delay by a skew can be canceled by distributing a conversion start signal to the voltage-time conversion circuit 12 through the same path as the distribution path of the clock signal 8A because distribution of the conversion start signal also delays by the same time in a pixel 1 where the count delays due to the skew of the clock signal 8A.

Seventh Embodiment

The seventh embodiment according to the present invention will be described. In the first embodiment illustrated in FIG. 1, the operation of the voltage-time conversion circuit 12 and count operation of the counter 6 simultaneously start. In the seventh embodiment, which uses the elements illustrated in FIG. 1, an arbitrary offset is added to output data by shifting the operation start of a voltage-time conversion circuit 12 and the start of count operation from each other. More specifically, a negative offset is added (make a value smaller than an actual output) when the count start delays from the voltage-time conversion start, and a positive offset is added (make a value larger than an actual value when the count operation starts first.

Conversion precision adjustment corresponding to sensitivity adjustment of the A/D converter can be easily realized, and the data width of output data can be effectively used. The seventh embodiment can also increase the speed or reduce the power consumption by using a counter such as a gray counter having a small data change amount in count operation. The seventh embodiment can be applied not only to the first embodiment shown in FIG. 1 but also to each embodiment using the counter 6 or 15. If the clock generation circuit 8 is used in place of the counter 6, the output start timing of the clock signal 8A output from the clock generation circuit 8 may be controlled.

Eighth Embodiment

Figure 8:
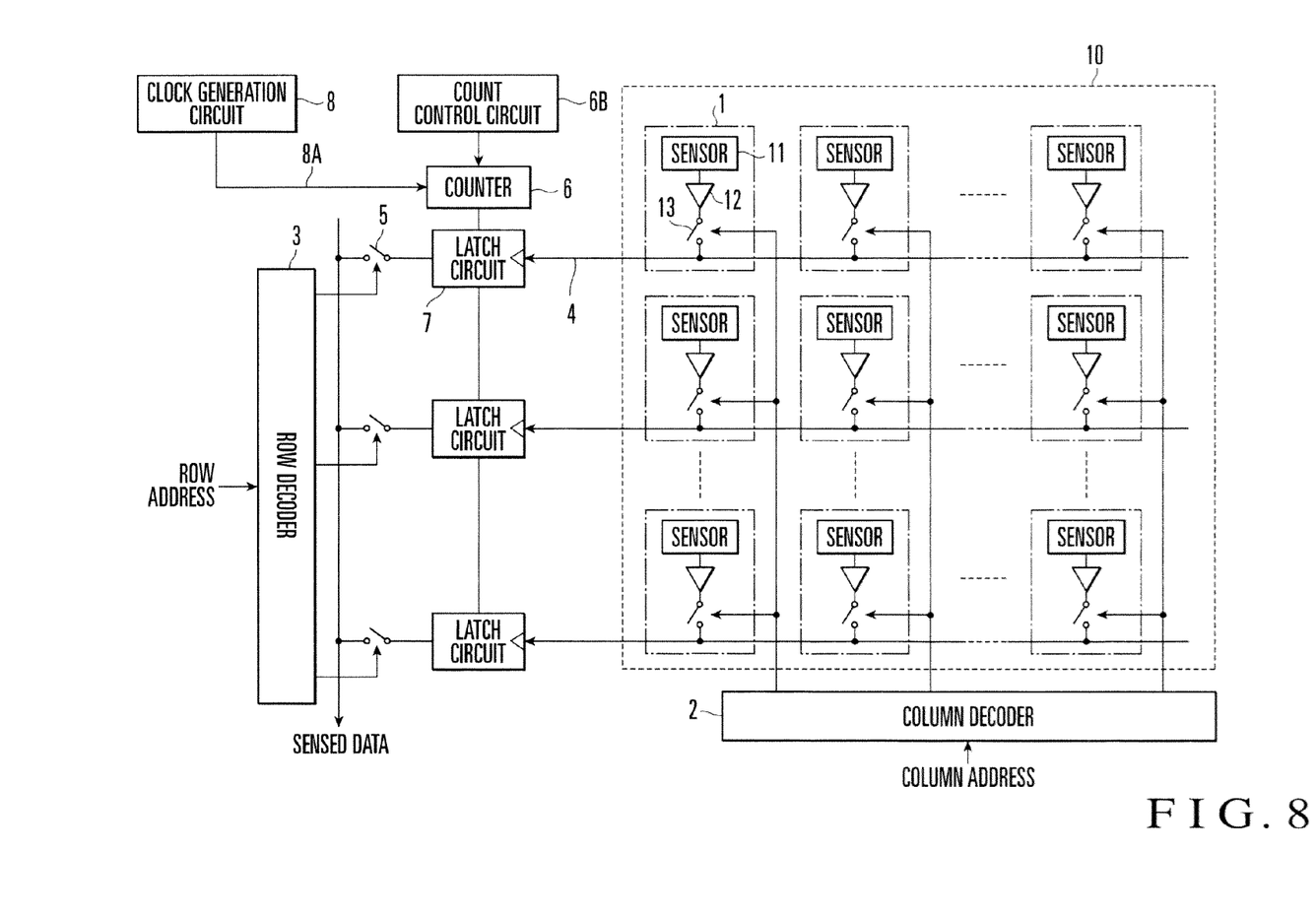
FIG. 8 is a block diagram showing a data conversion/output apparatus according to the eighth embodiment of the present invention.

The eighth embodiment according to the present invention will be described with reference to FIG. 8. FIG. 8 shows a data conversion/output apparatus according to the eighth embodiment. In the eighth embodiment, a count control circuit 6B for controlling count operation of the counter 6 is added to the first embodiment. The remaining arrangement is the same as that in the first embodiment. The count control circuit 6B can arbitrarily adjust the count value increment slope in incrementing the count value by the counter 6. This enables arbitrarily adjusting the conversion sensitivity for each region of an analog value to be converted when analog data is to be converted into digital data.

Figure 9:
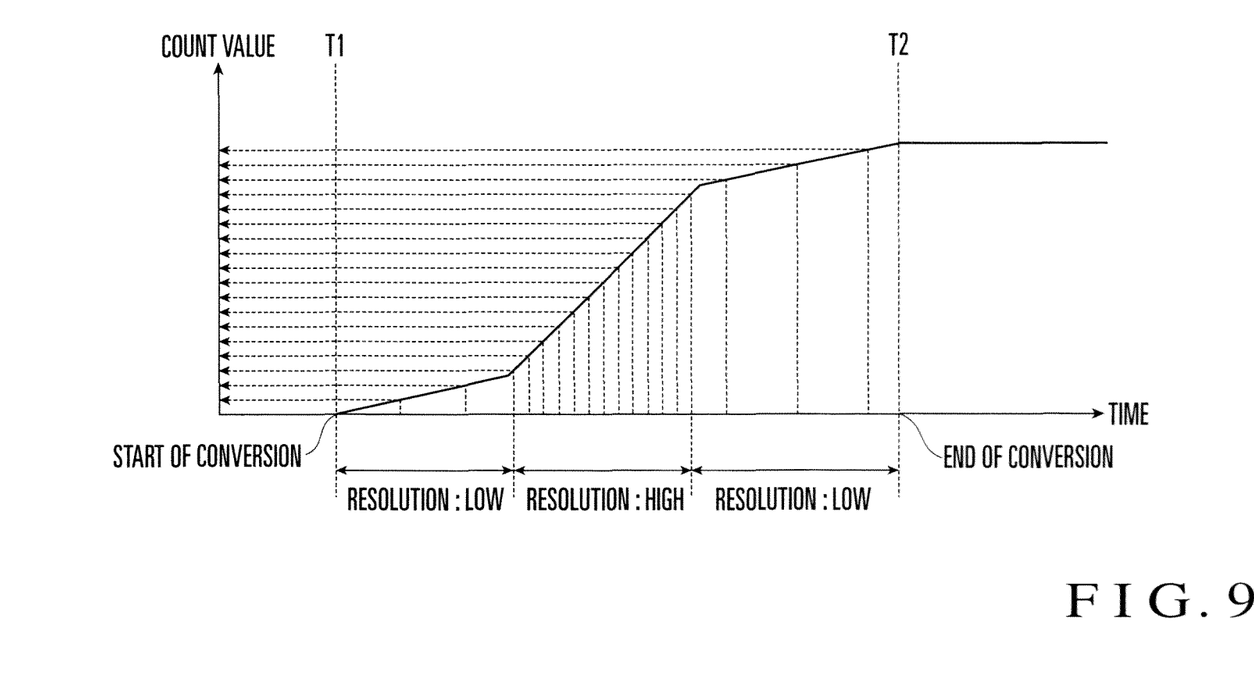
FIG. 9 is a graph for explaining the operation of the eighth embodiment of the present invention.

FIG. 9 shows the detailed operation of the eighth embodiment. In the example of FIG. 9, the count value increment amount is set small from the conversion start to given time, then set large, and set small again. By adjusting the counter operation speed, the sensitivity is set low when a voltage output from a sensor 11 is lower than or higher than a certain region. The conversion sensitivity is set high around intermediate voltages output from many sensors 11, thus increasing the resolution in this region. The resolution can be adjusted in an arbitrary region, and high-sensitivity conversion into digital data can be realized without increasing the data width of the counter 6.

The eighth embodiment can be applied not only to the first embodiment but also to each embodiment using the counter 6. In the use of the counter 15, a count control circuit may be formed in each pixel 1. If the clock generation circuit 8 is used instead of the counter 6, the count control circuit 6B may switch and control the frequency of the clock signal 8A output from the clock generation circuit 8. For example, the frequency of the clock signal 8A is set relatively low from the conversion start to given time, then set relatively high, and set low again. The same operation effect as that of FIG. 9 can be achieved.

In this way, according to the present invention, a data conversion/output apparatus is constituted by a large number of sensors (11), voltage-time conversion circuits (12) which are arranged adjacent to the respective sensors and change output levels upon the lapse of times corresponding to output voltage values from the sensors after a conversion operation start point in order to convert the voltage outputs of the sensors (11) into times, and sensed data generation circuits (7, 6A, 7A, 14, 15) for outputting, as digital data, lapse times until the output levels of the voltage-time conversion circuits (12) change after a substantial conversion start point.

A signal propagating through a long distance from each pixel via a data bus can be converted into an H- or L-level 1-bit digital signal, and degradation in precision by noise or the like can be prevented. A reference signal for a comparison circuit can be eliminated, unlike the prior art, and the counter can operate independently of the pixel array. The maximum value or the count value increment slope can be arbitrarily adjusted, and data can be converted with high resolution and a wide dynamic range.

What is claimed is:

1. A data conversion/output apparatus comprising:
a large number of sensors;
voltage-time conversion circuits which are arranged adjacent to said respective sensors and change output levels upon the lapse of times corresponding to output voltage values from said sensors after a conversion operation start point in order to convert voltage outputs of said sensors into times; and
sensed data generation circuits for outputting, as digital data, lapse times until the output levels of said voltage-time conversion circuits change after a substantial conversion start point,
said sensors are arranged in a matrix together with said corresponding voltage-time conversion circuits to constitute respective pixels, and
said data conversion/output apparatus further comprises group selection means for selecting, from the pixels in a column direction, pixels which are aligned in a row direction and connected to one of said sensed data generation circuits,
wherein said sensed data generation circuit includes a counter for counting a clock signal, a first latch circuit for latching a count value of said counter upon reception of an output from said voltage-time conversion circuit of each pixel in a selected group, and a second latch circuit for latching an output from said first latch circuit in accordance with a predetermined data reception signal.

2. An apparatus according to claim 1, further comprising control means for sequentially supplying outputs from said voltage-time conversion circuits to said sensed data generation circuits.

3. An apparatus according to claim 1, wherein an output from said second latch circuit is output as sensed data upon reception of a signal designating an individual pixel of the selected group.

4. An apparatus according to claim 1,
wherein said sensed data generation circuit includes a counter for counting a clock signal, and a latch circuit for latching a count value of said counter after a point offset from the conversion operation start point upon reception of an output from said voltage-time conversion circuit of each group-selected pixel.

5. An apparatus according to claim 1, wherein said sensed data generation circuit includes a counter for counting a clock signal, and a gate circuit for controlling count of the clock signal from said counter until an output from said voltage-time conversion circuit of each group-selected pixel is obtained after a time point offset from the conversion operation start point.

6. An apparatus according to claim 1, wherein
said sensed data generation circuit includes a counter for counting a clock signal, and a latch circuit for latching a count value of said counter after a time point offset from the conversion operation start point upon reception of an output from said voltage-time conversion circuit, and said latch circuit is arranged in each pixel.

7. An apparatus according to claim 1, wherein said sensed data generation circuit includes a counter for counting a clock signal for generating digital data corresponding to the output level of said voltage-time conversion circuit, and a count control circuit for controlling a count operation speed of said counter.

8. An apparatus according to claim 1, wherein said sensed data generation circuit includes means for changing a clock frequency of a clock signal.

9. A data conversion/output apparatus comprising:
a column decoder for selecting at once a plurality of pixels aligned on an arbitrary column from pixels arrayed in a matrix;
a plurality of data buses each commonly connected to a plurality of pixels aligned on each row out of the pixels;
a counter for sequentially outputting count values in accordance with internal count operation;
a plurality of latch circuits which are arranged on respective rows and latch the count values from said counter in accordance with level changes of said data buses corresponding to the respective rows;
a row decoder for selecting a row having a desired pixel out of the pixels selected by said column decoder; and
a plurality of row switches which are arranged on the respective rows and output as sensed data of desired pixels the count values latched by said latch circuits corresponding to the respective rows,
wherein each of the pixels has
a sensor for outputting a detection result as an output voltage value,
a voltage-time conversion circuit for changing an output level upon the lapse of time corresponding to an output voltage value from said sensor after a predetermined conversion operation start point, and
a column switch for outputting in accordance with selection of a pixel by said row decoder an output from said voltage-time conversion circuit to a data bus connected to the pixel,
said apparatus further comprising a plurality of output-side latch circuits which are interposed between said latch circuits and said row switches for the respective rows, latch outputs from said latch circuits in accordance with a predetermined data reception signal, and output the outputs to said switches.

10. A data conversion/output apparatus comprising:
a column decoder for selecting at once a plurality of pixels aligned on an arbitrary column from pixels arrayed in a matrix;
a plurality of data buses each commonly connected to a plurality of pixels aligned on each row out of the pixels;
a clock generation circuit for outputting a clock signal having a predetermined frequency;
a plurality of row counters which are arranged on respective rows, count clock signals from said clock generation circuit, and output count values to row switches;
gate circuits which are arranged on the respective rows and control output of the clock signals from said clock generation circuit to said row counters on the basis of output levels of said data buses;
a row decoder for selecting a row having a desired pixel out of the pixels selected by said column decoder; and
a plurality of row switches which are arranged on the respective rows and output as sensed data of desired pixels the count values from said row counters corresponding to the respective rows,
wherein each of the pixels has
a sensor for outputting a detection result as an output voltage value,
a voltage-time conversion circuit for changing an output level upon the lapse of time corresponding to an output voltage value from said sensor after a predetermined conversion operation start point, and
a column switch for outputting in accordance with selection of a pixel by said row decoder an output from said voltage-time conversion circuit to a data bus connected to the pixel,
said apparatus further comprising a plurality of output-side latch circuits which are interposed between said row counters and said row switches for the respective rows, latch outputs from said row counters in accordance with a predetermined data reception signal, and output the outputs to said switches.

* * * * *